// Patent 2,716,591 — Patented Aug. 30, 1955

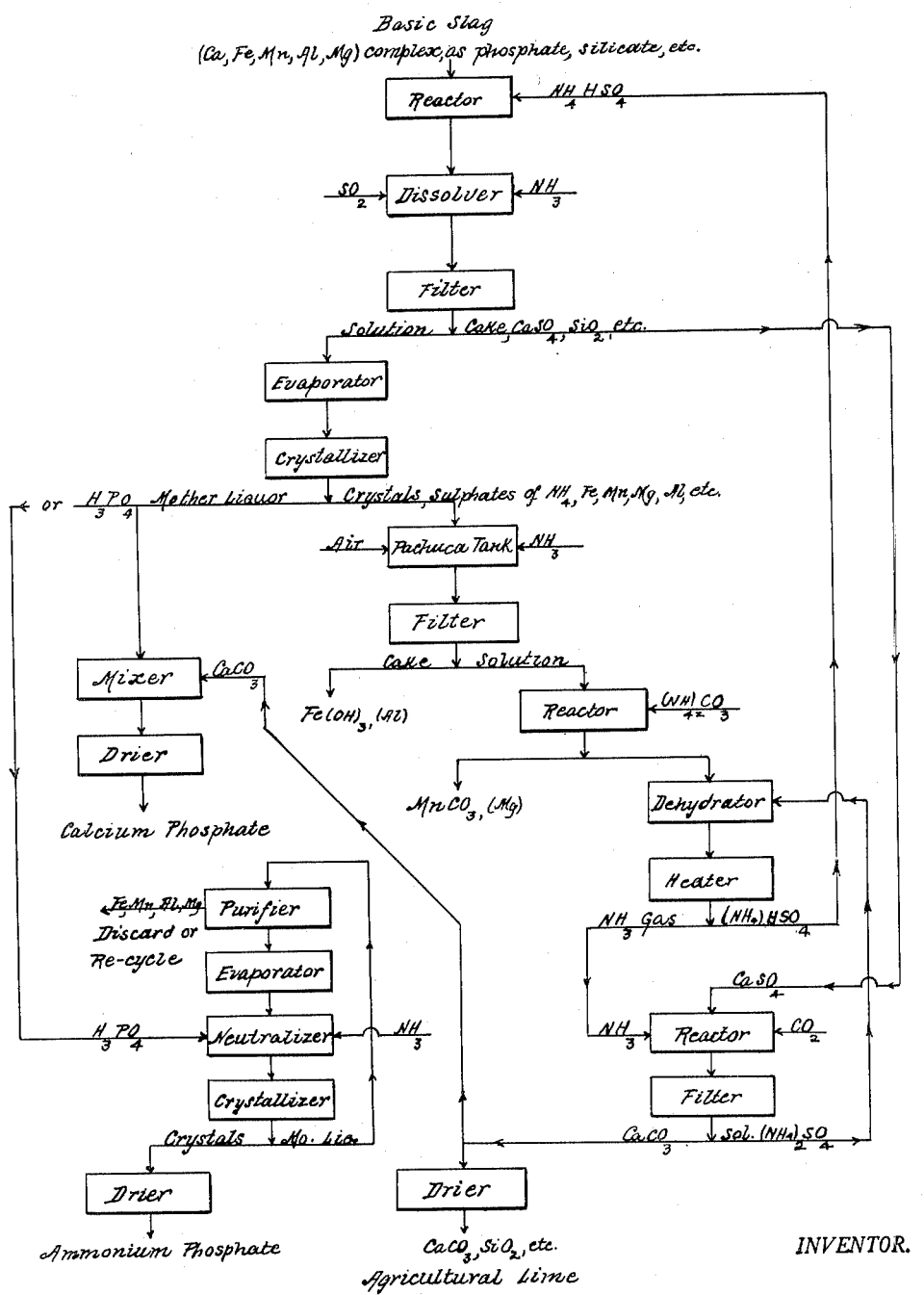

2,716,591

METHOD OF RESOLVING PHOSPHATIC COMPLEXES

Alfred M. Thomsen, San Francisco, Calif.

Application August 16, 1951, Serial No. 242,170

2 Claims. (Cl. 23—165)

In preparing natural phosphates for agricultural use the predominant method is to convert the insoluble tribasic phosphate into the soluble monobasic form by interaction with sulphuric acid. The gypsum formed in said reaction may either be left as an ingredient of the final product or it may be removed as substantially insoluble when the before mentioned material is leached with water. Upon evaporation, the leach solution becomes the socalled "triple strength" superphosphate of commerce; without such treatment it is generally designated as "superphosphate." The former product approximates an enrichment in phosphoric acid corresponding to the ratio of 3:1, manifestly very desirable as a saving in distribution though slightly higher in price.

The object of my process is to produce the higher grade type of super-phosphate without the tremendous waste of sulphuric acid now considered unavoidable in the industry. I accomplish this very desirable aim by a peculiar method of using the inherent properties resident in ammonium sulphate. Of course, these properties are quite well known to every chemist but sofar I believe no use has been made of them for the purpose or in the manner which I shall now explain in detail.

This economy in acid usage as well as certain technique in the removal of other impurities, such as iron, permits me to use very low grade forms of phosphatic material for my purpose. In the usage of the trade only a few per cent of iron can be tolerated in the raw material and the presence of much lime will either cause too low a phosphoric acid content in the finished product or too high acid consumption, or both. Contrariwise, I can use very low grade phosphatic material and much iron can be made an advantage rather than a disadvantage. "Redonda" phosphate and the basic slag of the steel industry are thus prime materials for my process. I am, of course, aware of the use of said basic slag with no chemical treatment whatsoever, only fine grinding, as a fertilizer provided the "citrate soluble phosphorus" be adequate and it be otherwise suitable. Much American basic slag does not conform to such specifications, but even the "good" slag will be much more properly utilized if it be processed as herein described. Naturally, the high grade mineral phosphates are more profitably handled in this manner than in the conventional way.

On my drawing I have given detailed steps for the way in which a very complex material, basic slag, is treated according to my process and I consider this as my "preferred" illustrative version. This does not mean that I "prefer" such material, but as it is very poor material, actually, it gives me the opportunity to show all steps needed. Naturally, a better type of raw material will not need all these steps and the exclusion of such will be obvious. There are also many other places where certain items of my process could be very advantageously applied and it is my intention to describe these briefly after I have shown the application of my process to one specific substance, such as basic slag. It is simplest to follow these steps as they appear on the drawing and I will add such elucidation at every step as may seem necessary.

The first step is the reaction between basic slag and ammonium bi-sulphate whereby the contained metals become converted to sulphate with the liberation of phosphoric acid and silica. Mechanically this reaction may be brought about in diverse manners. The powdered slag may be commingled directly with a solution of the bi-sulphate in which case the second step on the drawing, the dissolver, will take place simultaneously with the bi-sulphate reaction. The slag, in lump form, may be disintegrated in a solution of the bisulphate if the device used to contain the reacting materials be somewhat in the nature of a tube mill so that attrition will remove the calcium sulphate with which such lumps will otherwise be coated. In this manner much metallic iron may be separated in such form that it can be directly returned to the furnace from which said slag was derived.

The powdered slag may also be commingled with powdered bisulphate and heated to reaction temperature, in which case the dry reaction product is passed on to the dissolver where water is added. In another version the powdered slag may be mixed with the fused bi-sulphate, or said slag may even be mixed directly with straight ammonium sulphate and heated to the decomposition temperature of said salt, approximately complete at 350° C., in which case said decomposition to bi-sulphate takes place simultaneously with the reaction of said bisulphate with the phosphatic complex, and the ammonia gas evolved is, of course, re-cycled.

Manifestly, all such variations in manipulation are dependent upon local conditions and upon the type of slag made in the furnace. It is for the operator to determine for himself the technique most suited to his use and to proceed accordingly. In any event, the final product will be a slurry consisting of a water solution of phosphoric acid and metallic and ammonium sulphates commingled with silica and the substantially insoluble calcium sulphate.

This slurry is now separated into its soluble and insoluble components by means of a filter, but obviously any other conventional means of separation such as decantation or centrifuging may be substituted. However, prior to such separation, I have indicated the addition to the slurry of $SO_2$ and $NH_3$, respectively. The object of the $SO_2$ is to promote solution, chiefly of the Mn component, and may be omitted where not needed. The object of the $NH_3$ addition is to balance the $SO_2$ addition, the joint effect being to provide some additive ammonium sulphite which in the operation becomes converted to sulphate and thus supplies the replacement for the unavoidable loss of some ammonium sulphate in any cyclic process such as the one herein described.

I shall now confine myself to the solution obtained in the above mentioned filtration, the filter cake being reserved for further treatment. Said solution is now evaporated and cooled yielding a crop of crystals consisting of ammonium sulphate, and sulphates of Mn, Fe, Al and Mg. Obviously there will also be present a most haphazard mixture of "alums" used here as a generic name for the double salts of ammonium and the heavier metals, including aluminum. It is the intent of this crystal separation to obtain a phosphoric acid product, as the mother liquor, as high in phosphoric acid and as low in sulphates as is compatible with a commercial operation. In most cases this will require a two-step crystallization with intermediate mother liquor evaporation before the last crystallizing step. While this is not shown on the drawing, it is an obvious modification in order to render the magma mobile for crystal separation and handling. The final mother liquor, an essentially phosphoric acid product, is next shown as neutralized with calcium carbonate, obtained at a later step in the process and dried. Thus is obtained the first commercial product from the operation, a mono-calcium phosphate containing as its chief impurities a little silica and ammonium sulphate but still approximating 50% $P_2O_5$.

I have shown an alternate step for converting the liquid phosphoric acid into a solid form, namely, neutralization with $NH_3$ and crystallization as ammonium phosphate. The mother liquor from said crystallization is cyclically returned to the circuit after a purification and concentration by evaporation. The purification is not shown, and could be conventional, but in practice it would be done in the same manner as will now be described for the crystals of ammonium sulphate and alums obtained at an earlier stage in the process.

These crystals, separated from the phosphoric acid mother liquor, are now dissolved in water and oxidized with air until the ferrous iron has been substantially converted to the ferric form and then precipitated by the addition of ammonia as ferric hydroxide. A convenient device for this entire operation is the Pachuca tank, but any other type of aerator could be substituted. After such combined treatment the magma is filtered, yielding a filter cake of ferric hydroxide (with some alumina) and a relatively iron-free solution for the next step.

This consists of precipitating with a carbonated form of ammonia all the resident metals that can be separated by such means. The metallic carbonates thus obtained are easily separated by filtration, or otherwise, and the resultant filtrate will consist essentially of ammonium sulphate. The degree of carbonation influences the particle size of the precipitate as well as the thoroughness of the reaction so the ratio of $NH_3$ to $CO_2$ should be adjusted empirically to that point which produces the best over-all effect and then maintained. The filtrate is dehydrated and then heated until substantially decomposed into the bisulphate and ammonia gas both of which are used again. The bi-sulphate is recycled directly to the head of the process, the ammonia used where called for. On the drawing I have shown it used in the final step of the process which involves the first mentioned filter cake of silica and calcium sulphate.

The object of said final step is to recover for cyclic reuse in the process the sulphuric acid, originally resident in ammonium bi-sulphate, now present as calcium sulphate. This is done by the conventional reaction with $NH_3$ and $CO_2$, the final result being a solution of ammonium sulphate, and, in suspension therein, an easily filterable calcium carbonate. Separation is then made between the soluble and insoluble components, the former consisting of ammonium sulphate being re-cycled and the latter either used in the process as indicated, or dried and sold as "agricultural lime," or discarded as a waste, as the local conditions may dictate. Manifestly, a convenient place to recycle said ammonium sulphate is directly to the dehydrating step, as shown in the drawing, and then passing it on with the remainder of the cyclically used ammonium sulphate to the head of the process in the form of ammonium bi-sulphate.

A word might be added here on the use of the separated calcium carbonate as "agricultural lime." Thousands of tons of very finely ground limestone are used daily on the fields in the territory immediately surrounding the places where this basic slag originates. The function of colloidal silica, together with lime and carbon dioxide in making soil constituents available to the plant is well understood in agriculture. The mixture of these substances as discarded from my process should, therefore, be well received in agriculture.

Having thus described my process in terms of manipulative details I will now summarize and analyse the various successive steps which, collectively, constitute said process. These are:

1. Reaction between the "free" acid of ammonium bi-sulphate and the phosphatic complex.
2. Separation of soluble sulphates from insoluble sulphates and other insoluble substances produced in said reaction.
3. Separation between soluble sulphates and phosphoric acid, formed in the initial reaction, by crystallization and removal of said crystals.
4. Precipitating resident metals in said crystals by the addition of ammonia and separation of the precipitates thus produced, thus obtaining a substantially pure solution of $(NH_4)_2SO_4$.
5. Conversion of the separated calcium sulphate into the carbonate by the action of ammonia and carbon dioxide, and removing the precipitate of calcium carbonate from the solution of ammonium sulphate.
6. Regenerating and re-cycling ammonium bisulphate by heating the ammonium sulphate obtained in the preceding steps.
7. Neutralization of the phosphoric acid obtained in the preceding steps.

It will be obvious that this convenient method of using ammonium bisulphate as a substitute for sulphuric acid, with recovery of said bisulphate at the end of the series of reactions in the form of ammonium sulphate and then regenerating same by heating with attendant evolution of ammonia, will have many applications in industry. The underlying chemistry in so far as it resides in the properties inherent in the substances known as sulphate and bi-sulphate of ammonia is well known.

I will now briefly describe a combination of the herein disclosed reactions to sundry industries.

1. The de-calcification of dolomite, originally accomplished with sulphuric acid which has been superseded by the use of the bi-carbonate technique, can be advantageously restored in approximately its initial form by the substitution of ammonium bisulphate for sulphuric acid; separating gypsum, precipitating magnesia with ammonia, as carbonate and/or hydroxide, recovering ammonium sulphate from the final solution and heating same to reform the bi-sulphate. Applies to other Ca-Mg combinations.

2. In the foregoing case some losses in both ammonia and sulphuric acid is inevitable. Losses of ammonia would have to be made up from some outside source, but the great abundance of gypsum would make the sulphuric acid loss depend upon gypsum as a source of ammonium bisulphate. Likewise, to the extent to which anywhere, such as in the manufacture of fertilizers, sulphuric acid is called for, it is obvious that ammonium bisulphate can be substituted and if this were upon an extensive scale then gypsum could be made a source of such sulphuric acid instead of the acid factory of today. It is old to make ammonium sulphate from gypsum. It is old to commercialize the so-called "reclaimed acid" of the petroleum refiner by neutralizing it with ammonia and selling the ammonium sulphate thus produced. If, therefore, ammonium bisulphate were made from gypsum as herein disclosed, said bisulphate used in place of sulphuric acid in oil refining, the sludge removed and neutralized with ammonia, oily matters separated, and the resultant ammonium sulphate sold, there would be but little change in the over-all result except the economic gain of substituting gypsum for acid. It should be noted that the calcium carbonate simultaneously produced can be made as valuable, or more so, than the gypsum used.

3. As a final application I cite the use of this bi-sulphate substitution in coke oven technique. Some 500,000 tons of ammonium sulphate is produced yearly from this source by washing the gas with sulphuric acid, the virtually universal practice. It is obvious that a solution of the bisulphate can be substituted and owing to the great solubility of this salt the scrubbing medium will only need cooling to drop a large percentage of its ammonium sulphate. Solid bi-sulphate would then be added and the scrubbing medium would thus be reactivated for use. By heating the solid ammonium sulphate thus obtained, bisulphate and $NH_3$ would be produced. The bi-sulphate would be re-cycled as indicated and the $NH_3$ content of the gas stream would thus have been recovered in a pure and concentrated form without any recourse to outside purchased material, such as sulphuric acid. Were it desired to convert said recovered ammonia into a solid form, then any conventional method, such as the gypsum technique, could manifestly be employed at the will of the operator.

It is obvious that the actual composition of said phosphatic complex will determine how many of the steps shown on the drawing will be required. If a pure calcium phosphate, such as bone-ash, were considered there would certainly be no need to eliminate either iron or manganese. The same observation applies to a high grade mineral phosphate, although the evolution of volatile fluorides which is not shown on the drawing must be allowed for. With a high iron and alumina content, but with no manganese, a single precipitation without oxidation could remove such components and the poor filtration of such a ferrous precipitate can be much improved by a prior carbonation of the ammonia employed.

Even a basic slag could be so high in phosphorus and so low in manganese that it would pay better to remove said Mn and Fe as a bulk precipitate and return it to the blast furnace than to go through the separation step. Finally, a basic slag might even be resolved with sulphuric acid, manganese and iron separated as herein disclosed by the use of ammonia, the calcium sulphate converted to the carbonate by the use of more ammonia in conjunction with carbon dioxide, the total ammonia and the total sulphuric acid consumed being finally recovered as a commercial product, ammonium sulphate. In the present status of the market for all the chemicals involved, buy and sell, even such a combination would be a profitable use for basic slag. Manifestly, I consider that all such variations constitute a portion of the instant disclosure.

It is, of course, quite possible that the salient feature of my disclosure, namely the ammonium sulphate-ammonium bisulphate conversion, which is so well known and must have many applications elsewhere than those herein enumerated, has been used by others at some prior time. I, therefore, emphasize once more that I regard only the application of this reaction, in the manner and for the purpose indicated, as being my disclosure.

Having thus fully described my process, I claim:

1. The method of resolving a basic iron, manganese and phosphorus containing slag which comprises: reacting said slag with ammonium bisulphate until the resident metals shall have been substantially converted into sulphates with attendant formation of phosphoric acid; forming a water solution of said phosphoric acid and water soluble sulphates, and separating the same from the insoluble residue containing the substantially insoluble sulphates; evaporating and crystallizing said solution to obtain a motor liquor containing substantially all the phosphoric acid with but little sulphate and a crystal product consisting essentially of sulphates of the resident metals, separating said crystals from the mother liquor; dissolving said crystals in water and precipitating the iron from the solution by aeration and the addition of ammonia; separating said iron precipitate; precipitating the manganese resident in the resultant solution by adding carbonated ammonia and removing the manganese precipitate thus obtained; dehydrating and heating the resultant solution, containing essentially ammonium sulphate to produce ammonium bi-sulphate and recycling the bi-sulphate solution to the head of the process to react with slag.

2. The method of resolving a basic slag set forth in claim 1, with the added step of adding sulphur dioxide to the reaction mixture of ammonium bisulphate and slag, the resultant sulphite being oxidized to sulphate in the course of the subsequent steps of the process.

References Cited in the file of this patent

UNITED STATES PATENTS

| Number | Name | Date |
|---|---|---|
| 1,152,244 | Vis | Aug. 31, 1915 |
| 1,758,448 | Liljenroth | May 13, 1930 |
| 1,876,011 | Larsson | Sept. 6, 1932 |
| 1,944,327 | Hunyady | Jan. 23, 1934 |
| 2,059,449 | Sweet et al. | Nov. 3, 1936 |
| 2,201,522 | Depew | May 21, 1940 |
| 2,375,977 | Davis et al. | May 15, 1945 |
| 2,416,744 | Francis | Mar. 4, 1947 |